Figure 1:
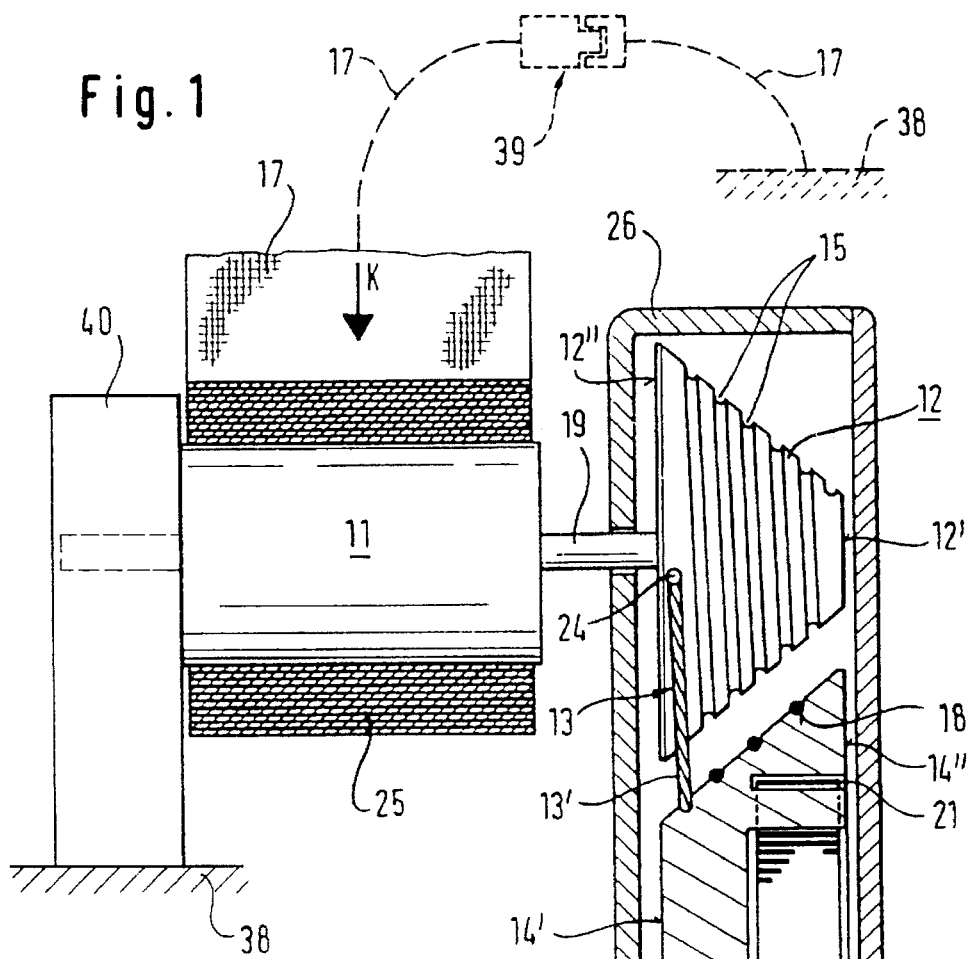

United States Patent [19]
Kopetzky et al.

[11] Patent Number: 5,624,084
[45] Date of Patent: Apr. 29, 1997

[54] TENSION REDUCER

[75] Inventors: Robert Kopetzky, Lonsee; Sabine Dreizler, Stuttgart; Ulrich Diepold; Matthias Pleyer, both of Ulm, all of Germany

[73] Assignee: Takata Vehicle Safety Technology GmbH, Ulm, Germany

[21] Appl. No.: 382,080

[22] Filed: Feb. 1, 1995

Related U.S. Application Data

[63] Continuation-in-part of Ser. No. 103,248, Aug. 9, 1993, Pat. No. 5,409,176.

[30] Foreign Application Priority Data

Mar. 16, 1994 [DE] Germany ........................... 44 09 009.9
Jul. 6, 1994 [DE] Germany ........................... 44 23 729.4

[51] Int. Cl.$^6$ ............................................................ B60R 22/44
[52] U.S. Cl. ............................................................ 242/375.3
[58] Field of Search ............................ 242/375, 375.1, 242/375.3; 280/806, 807

[56] References Cited

U.S. PATENT DOCUMENTS

| | | |
|---|---|---|
| 924,669 | 6/1909 | Johnson . |
| 1,968,536 | 7/1934 | Norling . |
| 3,075,724 | 1/1963 | Stahmer . |
| 4,084,765 | 4/1978 | Bonnaud ........................ 242/375.3 |
| 4,290,564 | 9/1981 | Karlsson . |
| 4,494,709 | 1/1985 | Takada . |
| 5,074,483 | 12/1991 | Wang . |
| 5,314,137 | 5/1994 | Fujimura et al. . |
| 5,409,176 | 4/1995 | Kopetzky . |

FOREIGN PATENT DOCUMENTS

| | | |
|---|---|---|
| 2329303 | 5/1977 | France . |
| 2547586B1 | 3/1977 | Germany . |
| 2635770A1 | 2/1978 | Germany . |
| 2824595 | 12/1978 | Germany ........................ 242/375.3 |
| 2727781A1 | 1/1979 | Germany . |
| 3116835A1 | 2/1982 | Germany . |
| 2917792C2 | 6/1982 | Germany . |
| 3313580A1 | 10/1983 | Germany . |
| 3714042A1 | 11/1988 | Germany . |
| 4225218A1 | 2/1994 | Germany . |

OTHER PUBLICATIONS

"Introduction to the Construction of Die Cast Tools" by Georg Menges and Paul Mohren, pp. 420–427, 1991.

"Foundation of Die Casting Technology" by Walter Mink, pp. 390–411, 1979.

"Plastics Moulds" by Kurt Rabe, p. 44, 1960.

Primary Examiner—John P. Darling
Attorney, Agent, or Firm—Fitch, Even, Tabin & Flannery

[57] ABSTRACT

A spring-driven reeling mechanism for safety belts 17 in motor vehicles has a belt reel 11 which is rotationally fixedly connected to a first draw reel 12 with a spiral-shaped guide groove 15. A flexible draw member 13 is wound into the guide groove 15 and extends to a second draw reel 14 with a spiral-shaped guide groove 18. The two draw reels 12, 14 taper in opposite axial directions. The draw reel 14 is acted on by a spiral spring 16 in a direction of rotation such that the safety belt 17 is wound onto the belt reel 11. The spiral spring 16 is accommodated in a hollow cavity 21 of the second draw reel 14.

15 Claims, 14 Drawing Sheets

TENSION REDUCER

CROSS-REFERENCE TO RELATED APPLICATION

This application is a continuation-in-part of U.S. patent application Ser. No. 103,248, filed on Aug. 9, 1993, and entitled "RETRACTOR DEVICE FOR A SEAT BELT", now U.S. Pat. No. 5,409,176 issued on Apr. 25, 1995.

The invention relates to a spring-driven reeling mechanism for safety belts in motor vehicles comprising a belt reel which can be blocked against rotation in the pull-out direction by a pull-out lock triggerable by accelerations caused by an accident and/or with an attempted rapid pull-out of the safety belt and which is rotationally fixedly connected, in particular coaxially and directly connected to a first draw reel which tapers in an axial direction and has a spirally-shaped guide groove on its periphery; wherein the first draw reel is rotationally fixedly connected, via a flexible draw member wound contrary to the direction of winding of the safety belt on the belt reel into the guide groove and secured at one end to the first draw reel, to a second draw reel which tapers in the opposite axial direction and is arranged parallel to and aligned sideways relative to the first draw reel, with the second draw reel having a spiral guide groove and with the other end of the draw member being secured to the second draw reel and being wound into the guide groove, wherein said second draw reel is biased by a spring arrangement, preferably a spiral spring arrangement in a direction such as to wind the draw member onto the second draw reel and the safety belt onto the belt reel, and wherein the two guide grooves are so shaped and arranged on the draw reels that the tensioned draw member which connects the two draw reels passes essentially kink-free, i.e. smoothly, into the two draw member windings on the draw reels.

With spring-driven belt reeling mechanisms the problem exists that the spring tension increases as the safety belt is drawn out further, so that for example the retraction force which amounts to only 2N at the start can increase with a fully drawn out belt to 18N. The fact that the diameter of the belt reel on the winding spindle reduces as the belt is increasingly drawn out, whereby an increasingly larger force is transmitted to the belt, contributes to this strong increase of the retraction force.

In order to avoid this disadvantage, it has already become known from U.S. Pat. No. 39 97 126, DE-OS 25 53 642, DE-OS 33 13 580 and DE-U-75 33 791 to insert a transmission between the belt winding spindle and the spiral spring which is to be tensioned by rotation of a shaft, with the transmission consisting of two cable or thread reels which are arranged parallel to one another and aligned sideways with one another and which taper conically or otherwise in opposite directions and are rotationally fixedly connected by a draw member, in particular a cable, thread or band wound onto them. By a suitable design of the thread reels one can thus ensure a substantially constant retraction force on drawing out of the safety belt. It is also possible to realize other desired retraction force characteristics by suitable shaping of the thread reels.

With the known belt reeling mechanisms, a special accommodation space is in each case provided for the spiral spring, so that the known belt reeling mechanisms take up a lot of space, in particular in the axial direction.

The object of the present invention is to provide a spring-driven reeling mechanism for safety belts in motor vehicles of the initially named kind in which the spring arrangement is so accommodated that no additional space is required for this.

For the solution of this object the invention provides, in a reeling mechanism of the initially named kind, that the spring arrangement is accommodated in a hollow cavity of the second thread reel which is at least partially surrounded by the guide groove.

Thus, in accordance with the invention the second thread reel is made partly hollow and simultaneously used as the accommodation housing for the spring arrangement, in particular the spiral spring. In this way one not only avoids an additional accommodation space for the spring arrangement, but rather a saving in weight is also achieved through the partially hollow design of the second thread reel. Furthermore, an ideal force transmission is obtained in this way from the spiral spring to the second thread reel without special force transmitting means.

Further advantageous embodiments are characterized in that:
- the hollow cavity is open towards one end face of the second thread reel and the spring arrangement is inserted from there, and/or
- the hollow cavity is provided at the side of the second thread reel to which the diameter increases, and/or
- the hollow cavity is arranged coaxial to the second thread reel, and/or
- the second thread reel sits rotatably on a fixed shaft of the housing and the spring arrangement which is formed as a spiral spring and accommodated in the hollow cavity is fixed radially outwardly at the second thread reel and radially inwardly to the housing, and/or
- the spiral spring is fixed radially inwardly on a fixed spigot of the housing which carries the shaft and which has a larger diameter than the shaft, and/or
- the two thread reels extend conically in opposite directions, or
- the generatrices of the two thread reels extend mutually curved relative to one another, or
- the generatrices of the two thread reels are curved in opposite directions, so that a retraction force which only changes fractionally is present at the start of the belt pull-out movement in the range of application, i.e. when the belt is being drawn out to be placed around the vehicle occupant, but reduces suddenly to a lower value from a predetermined pull-out length onwards at the start of the range in which it is worn by the occupant.

Further advantageous embodiments are characterized in that
- the mean diameter of the first thread reel carrying the belt reel is substantially smaller than the mean diameter of the thread reel connected to the spring arrangement, and/or
- that the larger diameter of the first thread reel is essentially the same as the smaller diameter of the second thread reel.

Through the increase of the diameter of the second thread reel at the expense of the diameter of the first thread reel more space is made available in the interior of the second reel for the accommodation of the spring arrangement. This design moreover has the advantage that the tension force for the safety belt exerted by the spring arrangement is substantially reduced, so that, for a specific reeling path of the safety belt, fewer turns of the second thread reel are required. Thus a greater wind-up length of the safety belt can be made available. Furthermore, in this way, one can ensure that at the start of the pull-out movement a reel transmission ratio of 1:1 is available which reduces with increasing pull-out.

The provision of a larger accommodation space for the spring arrangement is thus associated in advantageous manner with the making available of a larger wind-up length of the safety. The larger mean diameter of the second thread reel is thereby at least partially compensated for by a correspondingly reduced mean diameter of the first thread reel.

Furthermore, it is advantageous when the second thread reel is arranged on the side of the first thread reel remote from the draw-out direction of the safety belt.

The arrangement of the second thread reel at the side of the first thread reel remote from the draw-out direction of the safety belt has the advantage that adequate space is available for the accommodation of the housing in the region which accommodates the second thread reel beneath the belt coil, because there the mounting elements for the belt reeling mechanism are to be found, which are for example mounted to the vehicle floor.

A further aim of the invention is to substantially reduce the hysteresis of the spring arrangement. Moreover, the installation of the spring arrangement should be made easier.

In order to satisfy this object, the invention provides, in a belt reeling mechanism of the initially named kind, that the hollow space is covered over by a cover which is secured axially to the second draw reel in such a way that the spring arrangement is only surrounded by parts which rotate with the second draw reel.

A certain friction admittedly arises against the parts of the draw reel surrounding the spring arrangement as a result of the stationary arrangement of the radially inner end of the spring arrangement. Nevertheless, the hysteresis of the spring arrangement is substantially reduced because the regions of the spring arrangement which travel the largest distances are located radially outwardly. The installation of the spring arrangement within the hollow cavity of the second draw reel is made easier through the cover, which is preferably formed as a cover plate.

A belt reeling mechanism in accordance with the invention is problematic when the belt reel can be additionally acted on by a drive source other than the draw reel arrangement, for example by a belt tensioning device. In this case it could transpire that the first draw reel is accelerated so strongly in the unwinding direction of the flexibly draw element that the flexible draw element becomes loose, despite the spring arrangement which is tensioning it, and hangs through, whereby the danger of its sliding out of the guide grooves exists.

A further aim of the invention is thus to ensure, in a spring-driven belt reeling mechanism of the initially named kind, that the draw member is also under full tension even when the belt reel is actuated in the belt winding direction by other drive sources.

In order to satisfy this object, the invention furthermore provides that a free wheel arrangement is inserted between the belt reel and the first draw reel which, on driving of the first draw reel in the belt winding-up direction transmits torque to the belt reel, but which transmits no or only a minimum of torque onto the first draw reel when driving the belt reel in the belt winding-up direction through the other drive source, for example by a belt tensioning device.

The free wheel ensures a troublefree force transmission from the spring tensioned draw reel arrangement to the belt reel during normal operation. If, however, a belt tensioner is active on the belt reel, for example in the case of an accident-depending acceleration, then the free wheel prohibits a torque transmission to the first draw reel whereby the draw member remains fully tensioned also as a result of the action of the spring arrangement, and the danger of it springing out of the guide grooves is banned.

A further aim of the invention is to minimize the frictional forces which arise in the bearings of the rotational axle for the belt reel, or for the first draw reel and the second draw reel.

This takes place in accordance with the invention in that the safety belt is drawn off on the same side of the rotational axis of the belt reel as the draw member from the first draw reel, but in the opposite direction to the draw member and in that the diameter of the rotational axle of the second draw reel arranged at the side of the first draw reel opposite to the belt draw-out direction is substantially smaller than the diameter of the rotational axle of the belt reel.

As a result of the draw-out direction of the safety belt and of the flexible draw member being on the same side of the rotational axis of the belt reel, the bearing friction forces in the bearing or in the bearings of the belt reel during extraction and retraction of the safety belt are at least so strongly reduced that only minor bearing friction occurs. As a result of the small diameter of the rotational axis of the second belt reel, the bearing friction there can also be kept minimal. The diameter of the rotational axle for the second draw reel, which is preferably fixed in the housing, preferably amounts to only 2 to 5 mm.

The flexible draw member preferably consists of a comparatively thin thread. The thread thickness amounts to a few tenths of a millimeter.

A problem in the installation of such spring-driven belt reels lies in reliably holding the thread wound onto one of the draw reels until the free end is connected with the other draw reel and the arrangement is so set under thread tension that the thread is forced into the guide grooves of the two draw reels.

A further object of the invention thus lies in making it easier to install the belt reeling mechanism after the thread has been wound onto one of the draw reels.

In order to satisfy this object, the invention provides that the draw member, after being wound onto one of the draw reels, preferably the first draw reel, is secured by a material layer applied onto the wound surface and at least substantially covering the surface against automatic release from the surface; and in that the material layer can be removed from the surface after connection of the draw member with the other draw reel (14) and tensioning of the draw member, at least to the extent that the draw member can be unwound from and wound onto the draw reel again without problem.

The basic concept of this embodiment is thus to be seen in the fact that the thread which is preferably wound onto the first draw reel, for example by means of a suitable device, is held in the guide groove by an easily removable holding means, in particular by wax or by a foam cover hood, until the free end of the thread is connected to the second draw reel and the second draw reel, which stands under spring tension, is tensioned against the first draw reel held firmly by suitable means. The draw reel arrangement can now be assembled with the belt reel. During the first use, i.e. on unwinding the belt reel, a wax layer which is then provided on the first draw reel will break off on its own accord so that no special measures are required to remove the material layer securing the thread.

After the tension has been established of the two draw reels relative to one another, a resilient foam material cover hood applied to the first draw reel can be simply removed, whereby the draw reel arrangement is then in an operable state.

A further object of the invention is to be able to store and transport the draw reel arrangement under spring tension without problem until it is assembled with the belt reel.

For the solution of this object, the invention provides that after the assembly of the first draw reel which is preferably fully wound with the draw element to the second draw reel in the housing which stands under full spring tension and is connected to the draw element, the first draw reel is held by a rotation prevention device against unwinding of the draw element by the spring tensioned second draw reel until the rotationally fixed connection with the belt reel has been established.

Through the rotion prevention device of the invention, the fully pretensioned draw member arrangement, i.e. a draw member arrangement provided with a fully wound first draw reel, can be preassembled without problem in this form and brought to the location where it is assembled with the belt reel. A further advantage of the rotation prevention device is that it firmly holds the first draw reel, which is not yet connected with the rotational axle of the belt reel and thereby guided for rotation, not only in the fully pretensioned state, but rather also in a substantially centered manner within the housing accommodating the draw member arrangement. Thus, on assembling the housing containing the draw member arrangement to the belt reel mechanism, an alignment of the first draw reel with the belt reel is ensured which is already sufficient that a problemfree axial plugging together of these two components is guaranteed. By way of example, the first draw reel can have an axial four-sided opening into which a four-sided pin provided at the shaft of the belt reel can engage.

As a result of friction against the surrounding components, the spring arrangement of a belt reeling mechanism in accordance with the invention has a considerable hysteresis which signifies that the belt retraction force is substantially lower than the force which is required to draw out the belt.

The injection molding process is primarily suited for the economical manufacture of the draw reels consisting of plastic material. However, the injection molding die must normally be axially split as a result of the receiving groove at the outer periphery of the draw reel for the draw member, which is in particular realized as a thread, in order to enable trouble-free molding. In this way, burrs can arise during molding in the thread guide grooves which require revision work. Such revision work is either not economical or not justified or can lead, if not carried out, to the thread—which is repeatedly wound and unwound onto the draw reel in operation—becoming damaged in the course of time which brings about a danger of breakage and thus to a failure of the tensioning of the applied safety belt which is important for the safety of the vehicle occupant.

A further object of the invention is thus to provide a method, a draw reel and an injection mold for the manufacture of the draw reel with which the draw reel can be produced economically with a completely smooth surface within the guide grooves without revision work being necessary after the injection molding.

In order to satisfy this object, the invention provides that the injection molding die is split along the plane disposed perpendicular to the axis at the level of the largest diameter of the draw reel and the shaped part surrounding the grooved outer surface of the draw reel has an uninterrupted continuous inner surface complementary to the grooved outer surface of the draw reel; that the following parameters are so matched to one another that a destruction-free axial removal of the shaped part surrounding the grooved outer surface of the draw reel from the draw reel is possible:

a) the mean peripheral wall thickness of the rotational body;
b) the flank angle of the guide groove;
c) the base width of the ribs present between two neighboring guide grooves;
d) the minimum taper angle of the draw reel;
e) the depth of the guide grooves;
f) the modulus of elasticity of the plastic of the draw reel;
g) the shape and thickness of the inner carrying walls of the draw reel;
h) the material of the draw reel, which is preferably polyoxymethylene;
i) demolding temperature of the injection molding die;

and that the mold part surrounding the grooved outer surface and preferably also the inner mold part can be drawn off axially from the finished draw reel.

In this way a draw reel arises in which the guide grooves provided in the outer surface of the rotational body are free of burrs without the need for revision work.

The basic concept of this embodiment thus lies in so forming the draw reel, and in particular the guide grooves arranged thereon, that an axial extraction of the mold part of the mold tool which is in one piece in the region of the outer surface of the draw reel is possible in the tapering direction, despite the unavoidable undercuts for the draw member required in the area of the guide grooves.

During this the radially outwardly projecting ribs, and/or the peripheral wall of the preferably hollow-shaped winding body, and/or the walls which extend essentially radially inwardly from the latter to a carrying spigot which is preferably provided there, yield elastically in the manner required for destruction-free demolding. After the demolding the elements which have been resiliently deformed for a period of time then return into their initial position so that the finished draw reel finally has precisely the shape determined by the injection mold.

The resilient design of the draw reel in accordance with the invention is particularly well suited for tapering draw reels, in particular conical draw reels intended for safety belt arrangements because the forces which are required to tension the safety belt are comparatively low and are not comparable with the high tensile forces which arise during an accident. As a result of the design of the invention there arises a peripheral surface at the drive reel which is admittedly still elastically deformable under the action of large forces, but is completely burr-free so that it is particularly well suited for the purposes of a compensation transmission in a safety belt arrangement. Thus, in accordance with the invention, the circumstance is advantageously exploited that the draw reel need only take up comparatively small forces in use, so that an elasticity can be selected which is adequate for destruction-free demolding, but nevertheless still ensures the required strength.

Particularly preferred is the design of a draw reel which is characterized in that the following parameters are so matched to one another that a destructionfree axial extraction of the mold part surrounding the grooved outer surface of the draw reel from the draw reel is possible:

a) the mean peripheral wall thickness of the rotational body;
b) the flank angle of the guide groove;
c) the base width of the ribs present between two neighboring guide grooves;
d) the minimum taper angle of the draw reel;
e) the depth of the guide grooves;
f) the modulus of elasticity of the plastic of the draw reel;
g) the shape and thickness of the inner carrying walls of the draw reel;
h) the plastic material.

It is of particular advantage when, the side of each guide groove facing the tapered end of the draw reel is followed by a radially projecting rib and then up to the next turn of the guide groove, by a peripheral surface which lies radially further inwardly than the preceding guide groove, with the peripheral surface tapering in the direction of tapering of the draw reel with a smaller angle. In this way, during demolding, each peripheral rib following a guide groove in the direction of tapering need only be axially loaded once from the associated complementary mold part, but not however by further mold parts.

Figure 2:
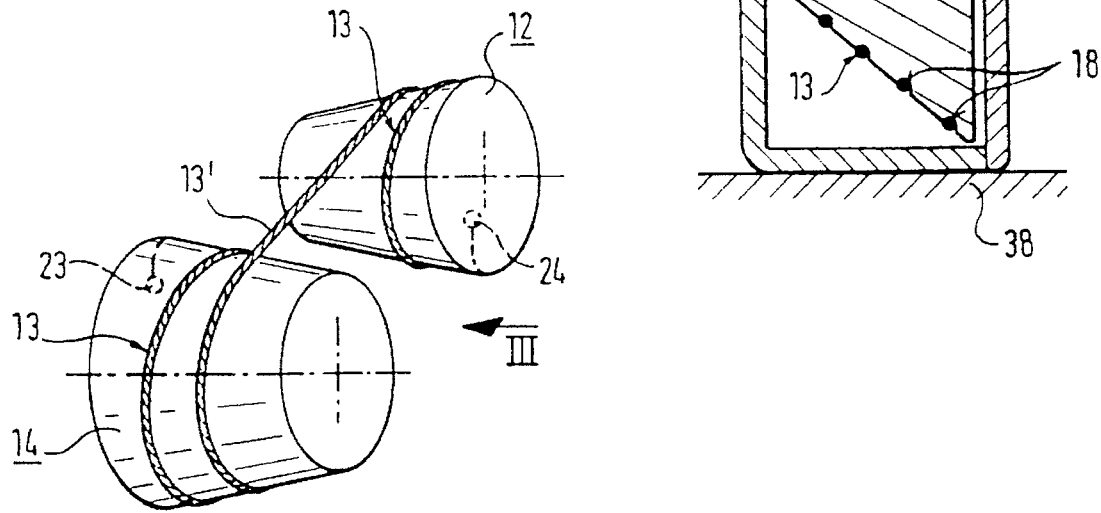
Figure 3:
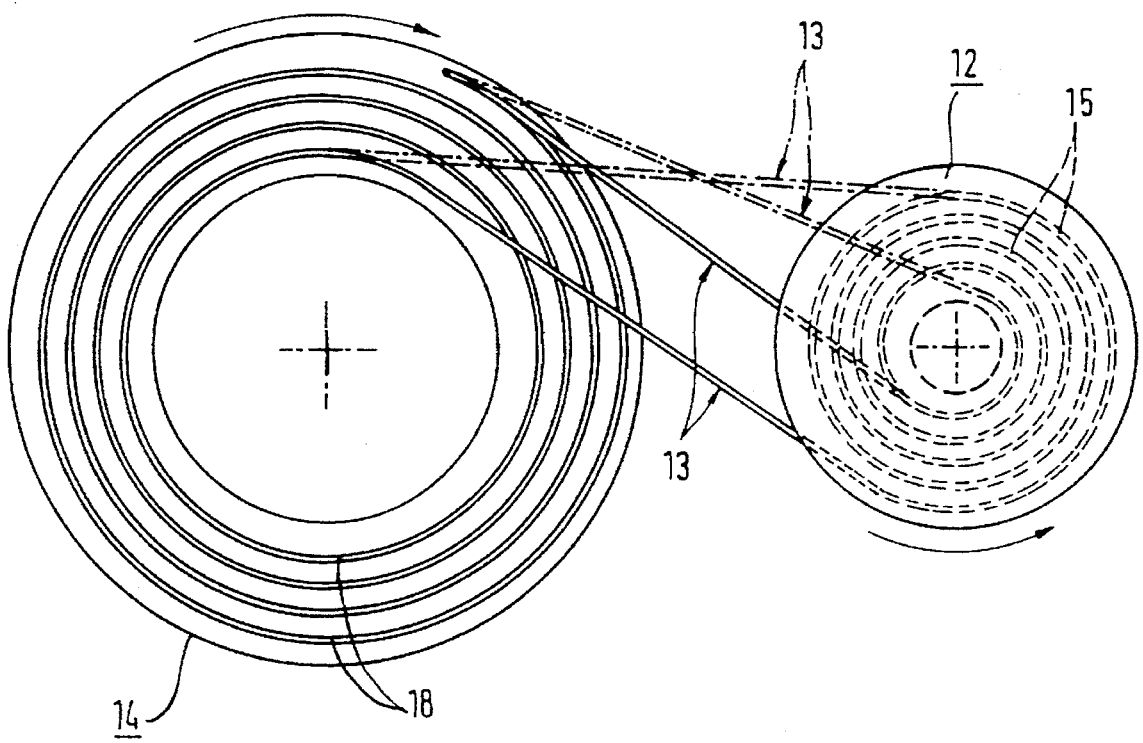
Figure 4:
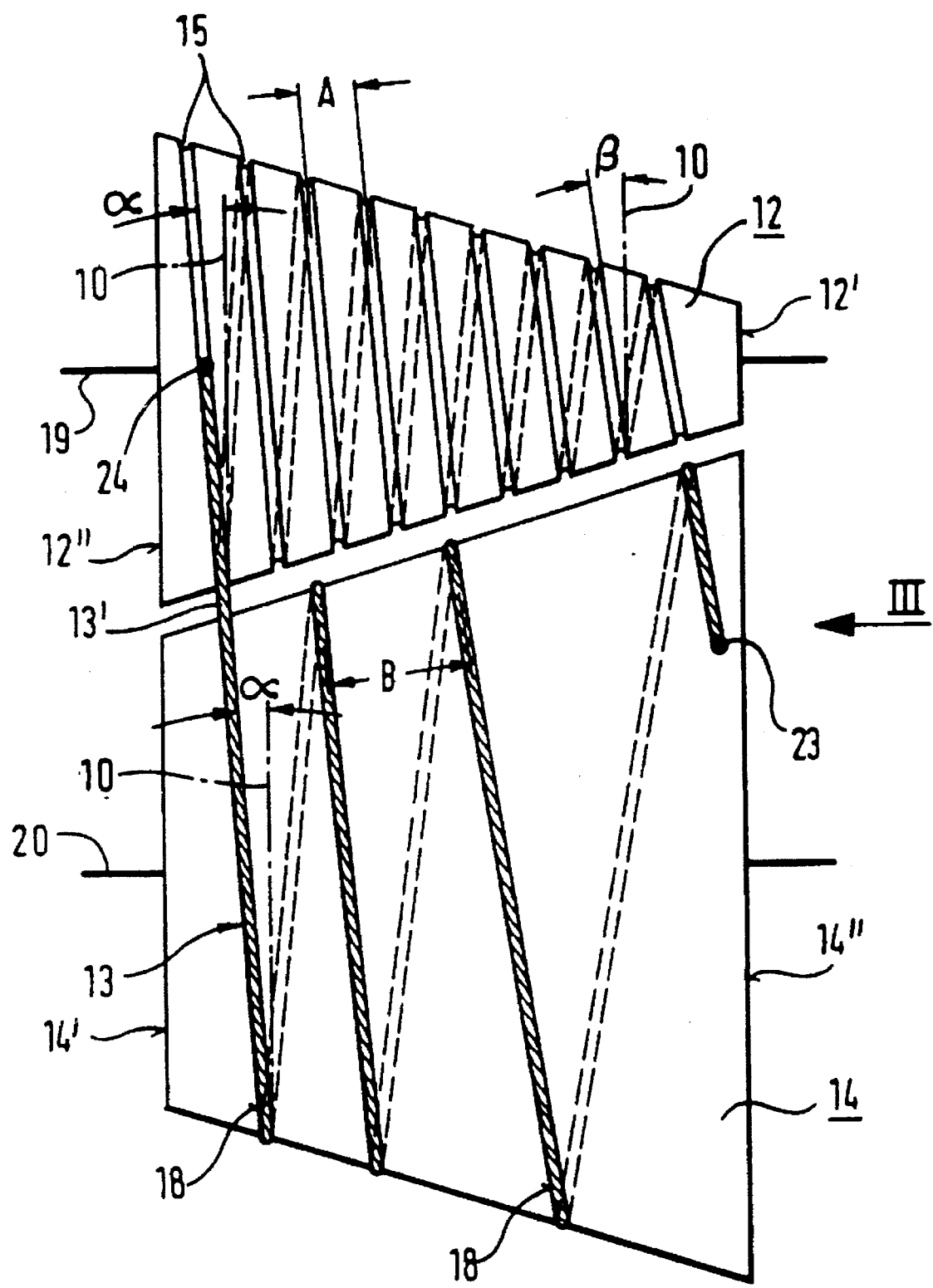
Figure 5:
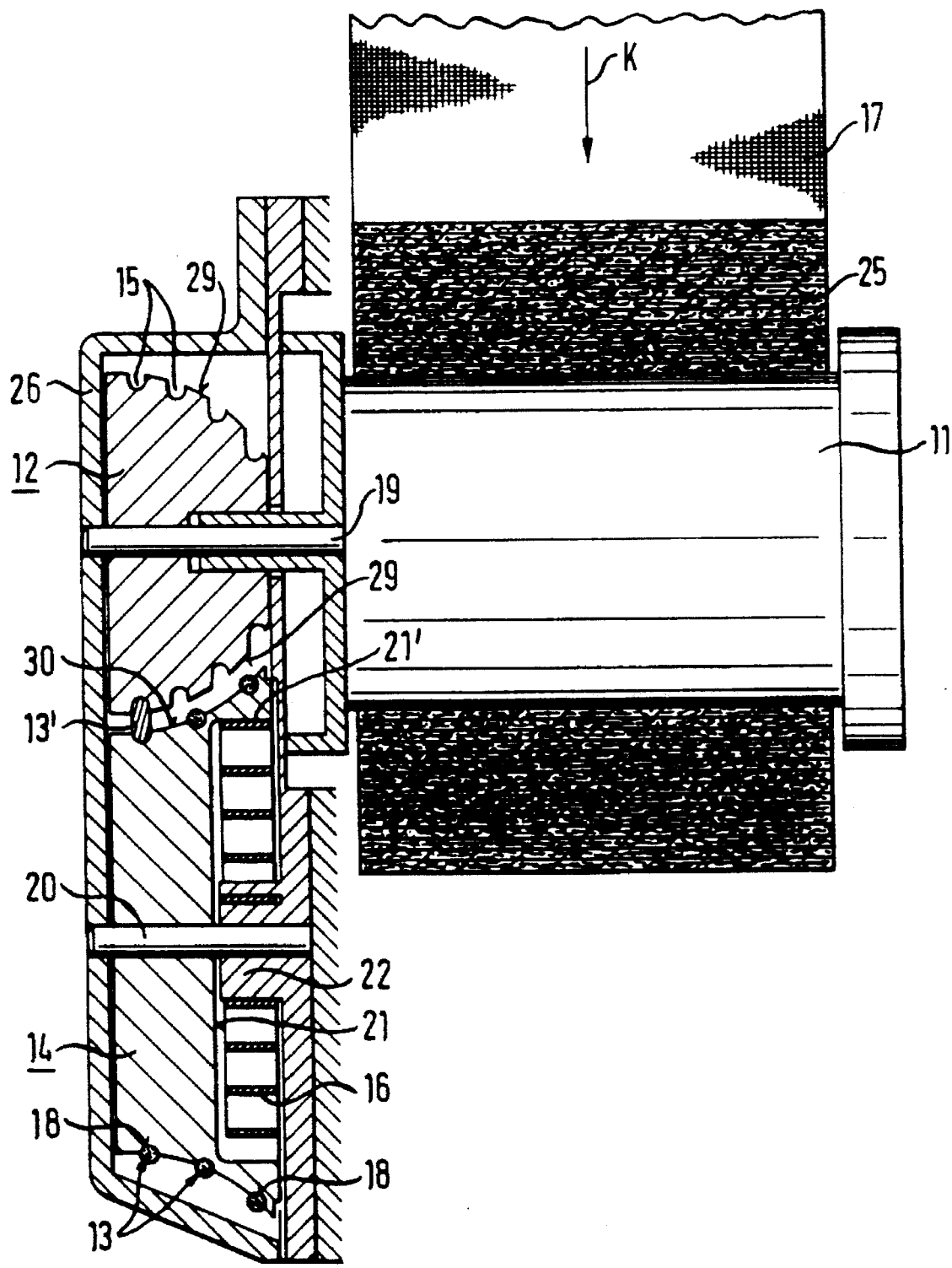
Figure 6:
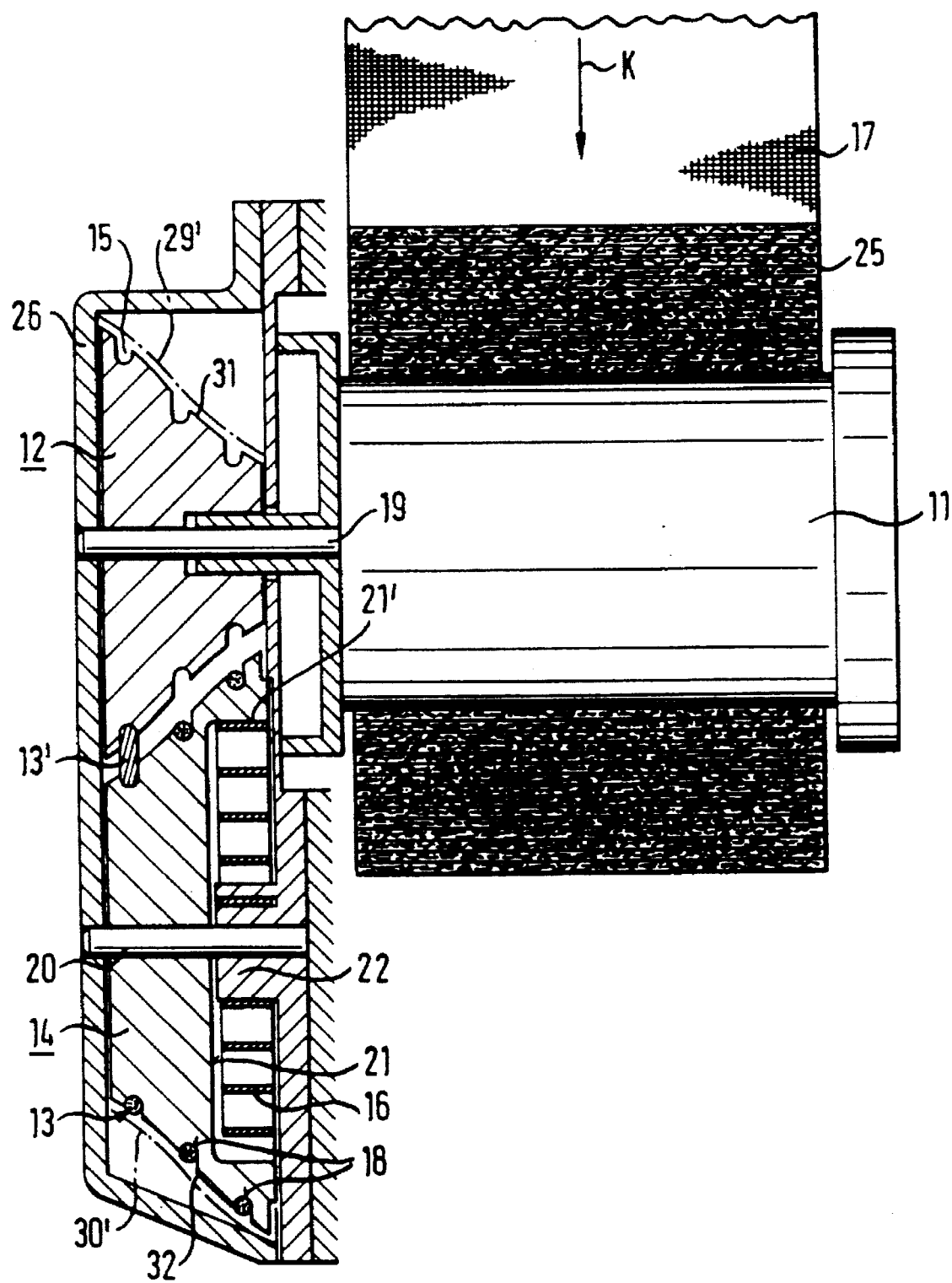
Figure 7:
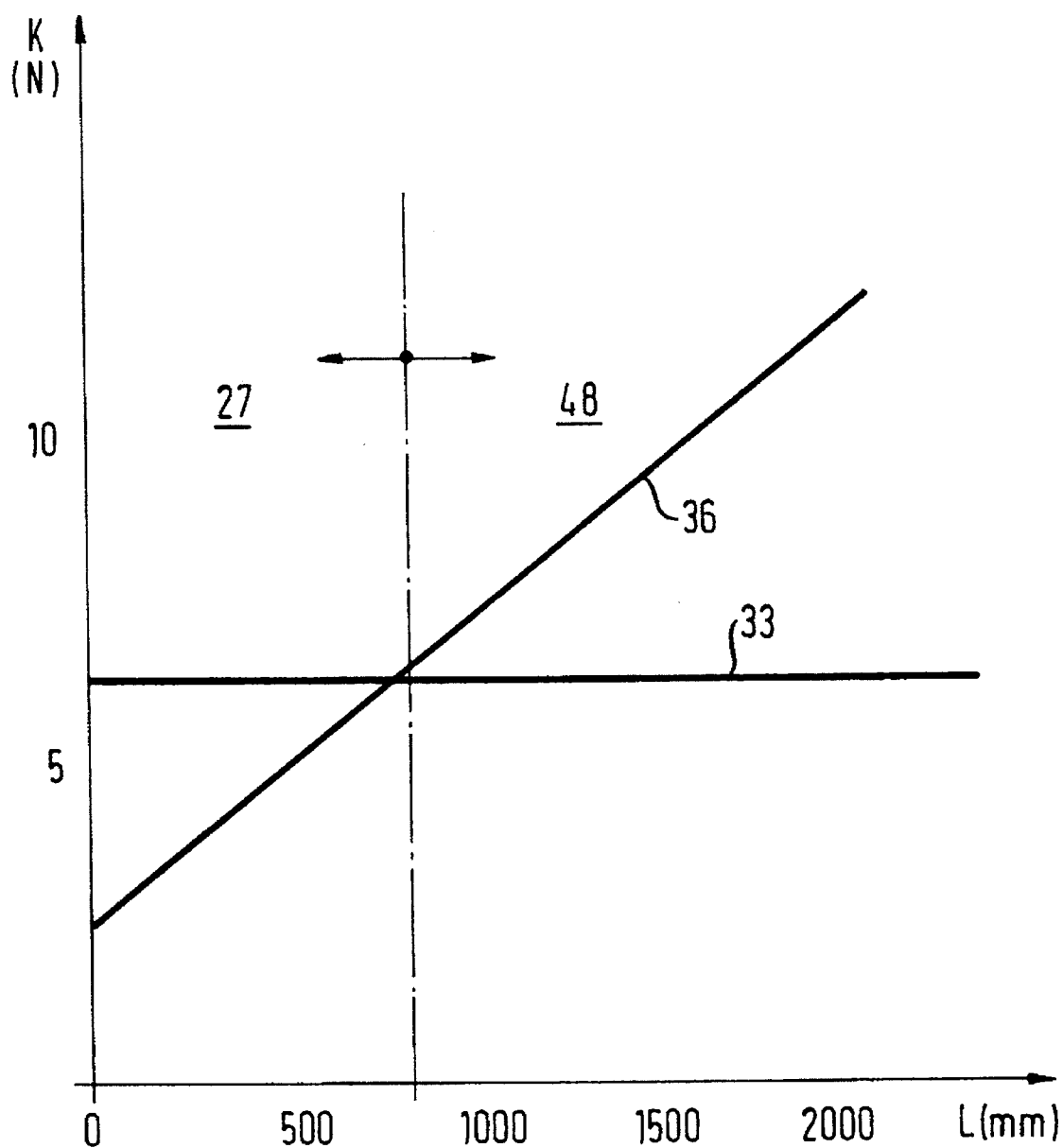
Figure 8:
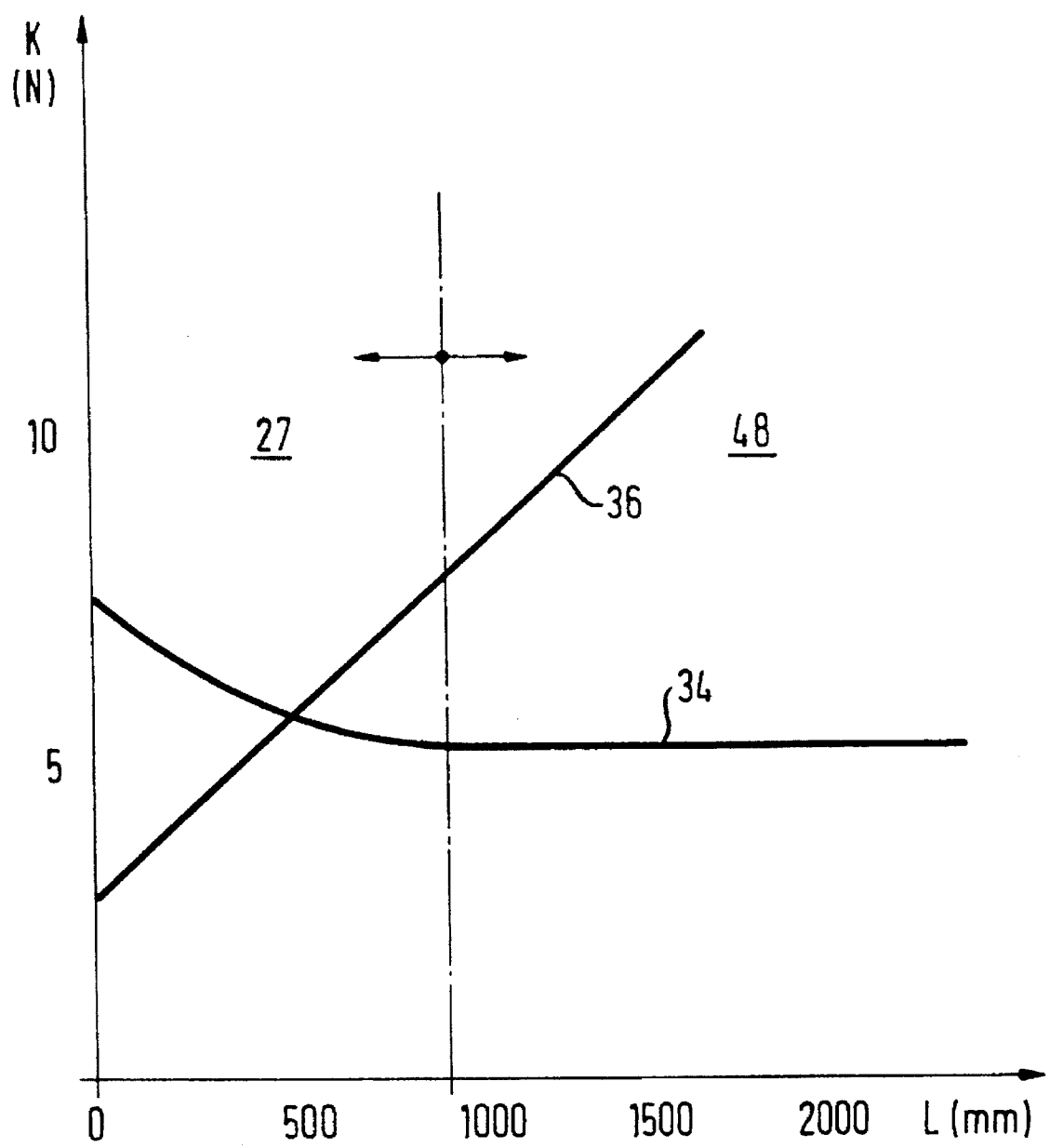
Figure 9:
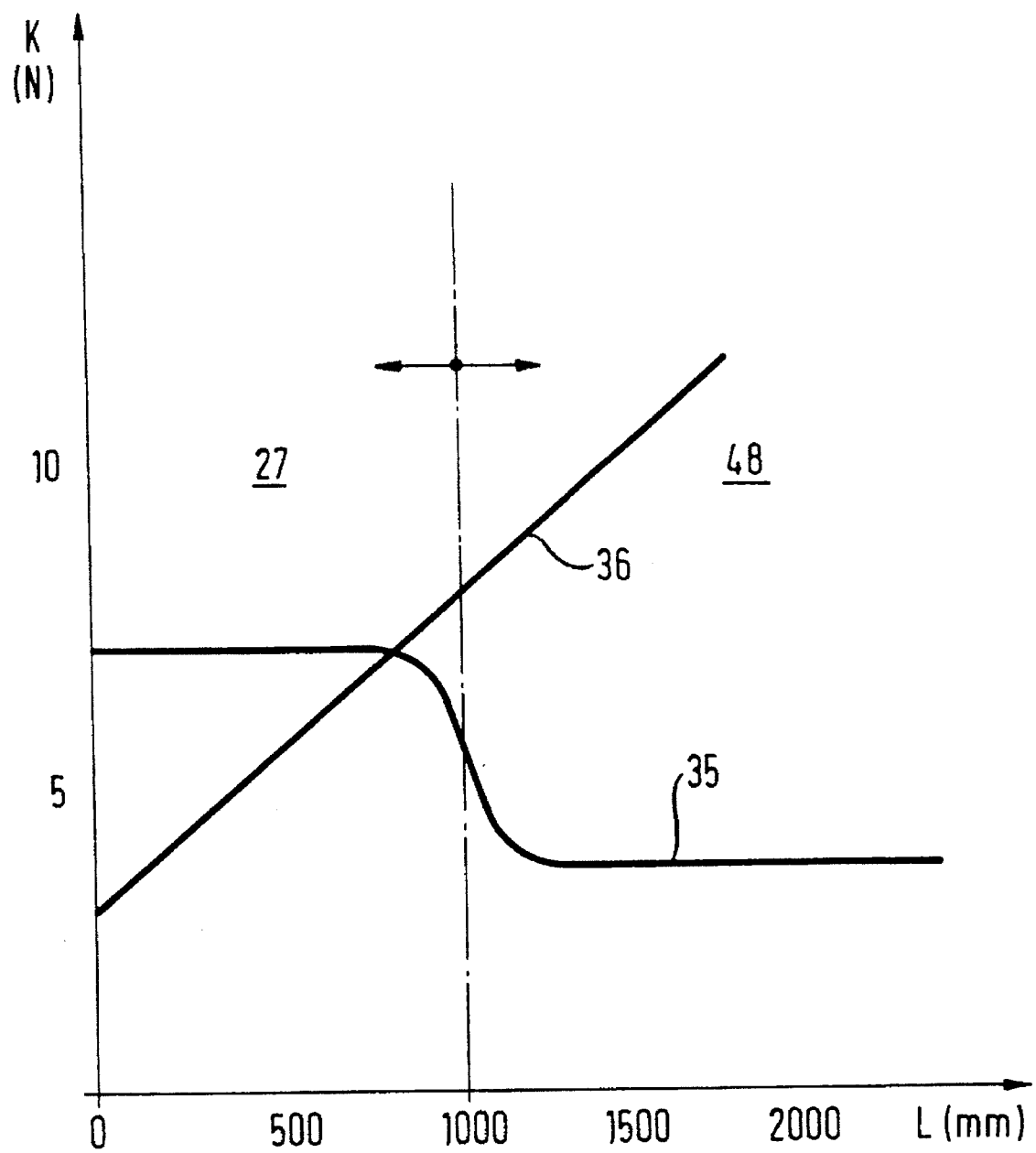
Figure 10:
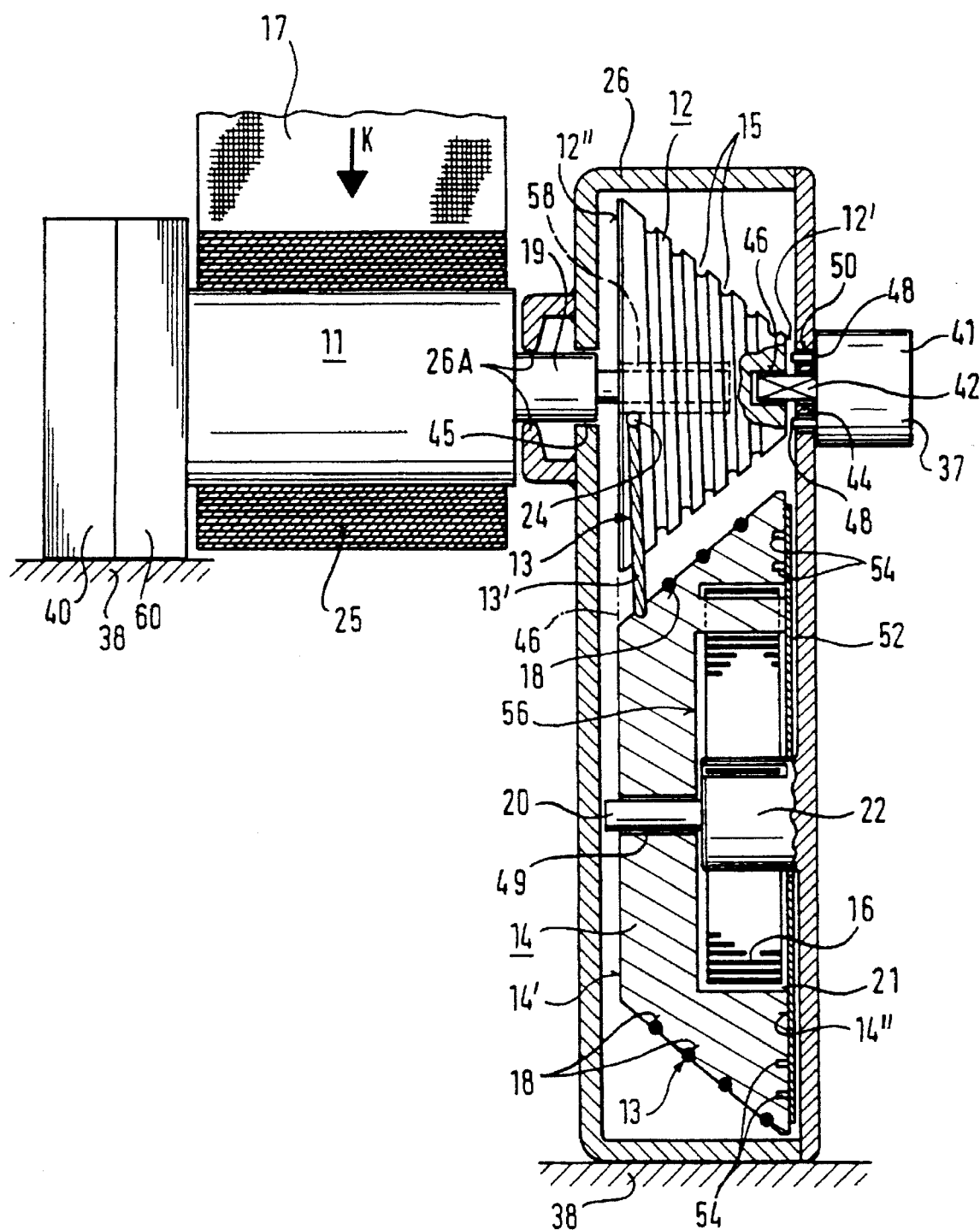
Figure 11:
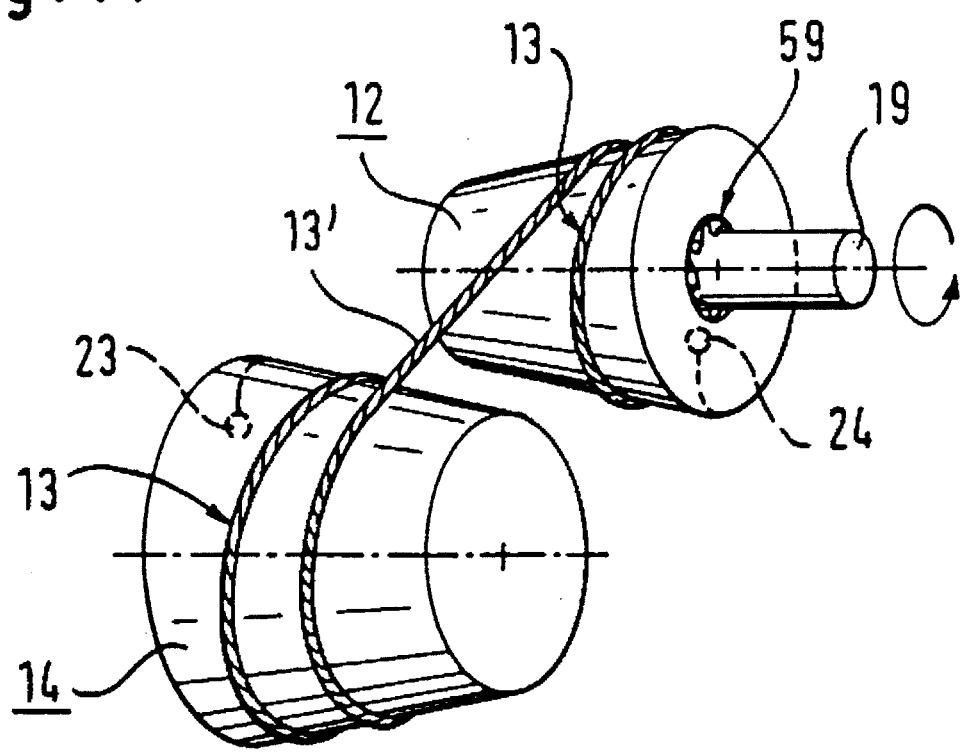
Figure 12:
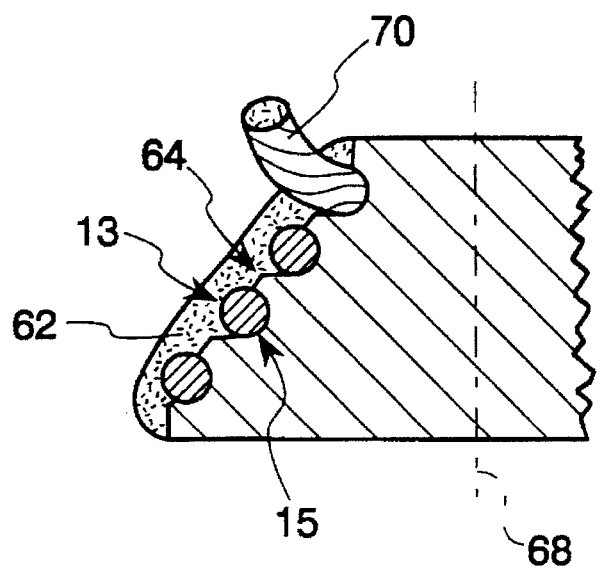
Figure 12A:
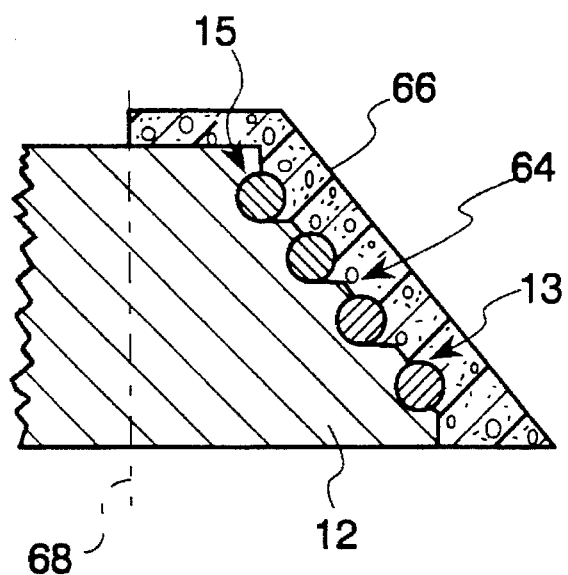
Figure 14:
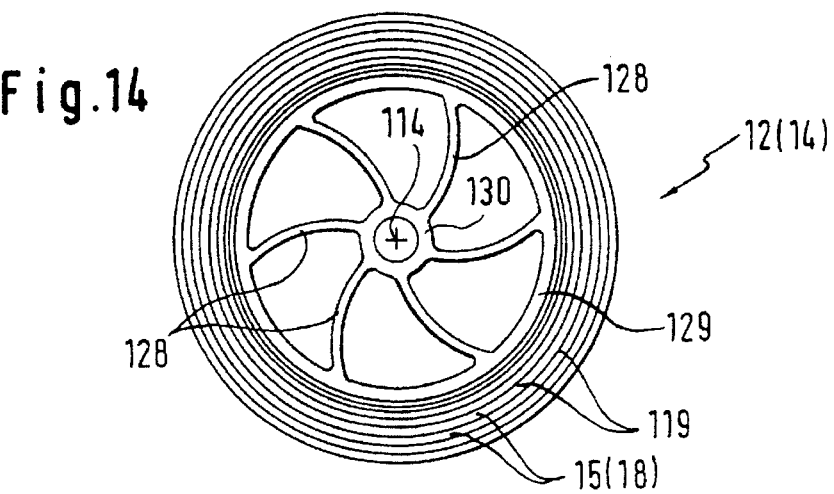
Figure 13:
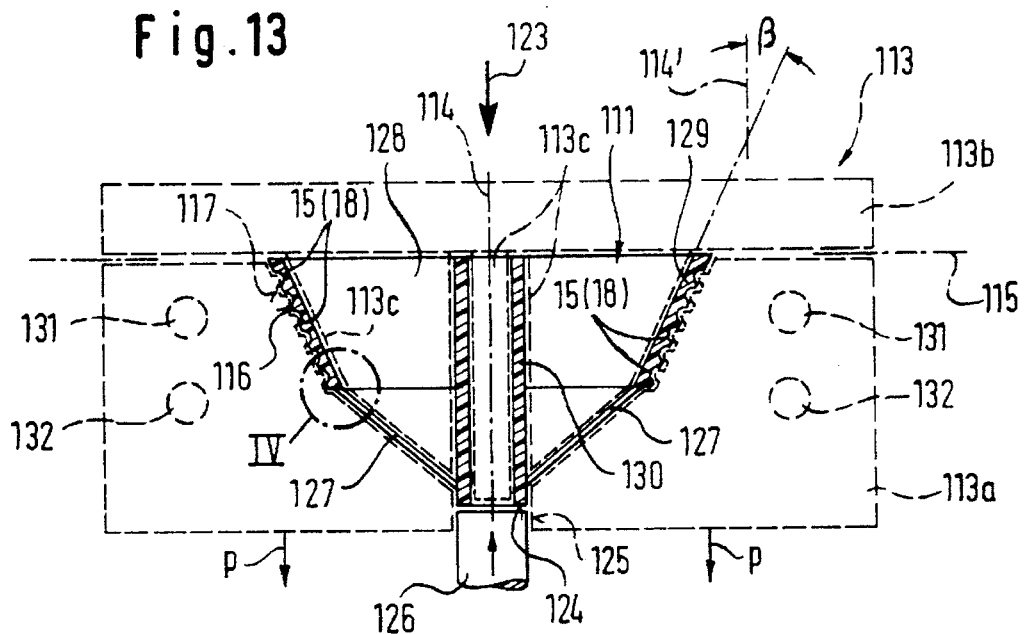
Figure 15:
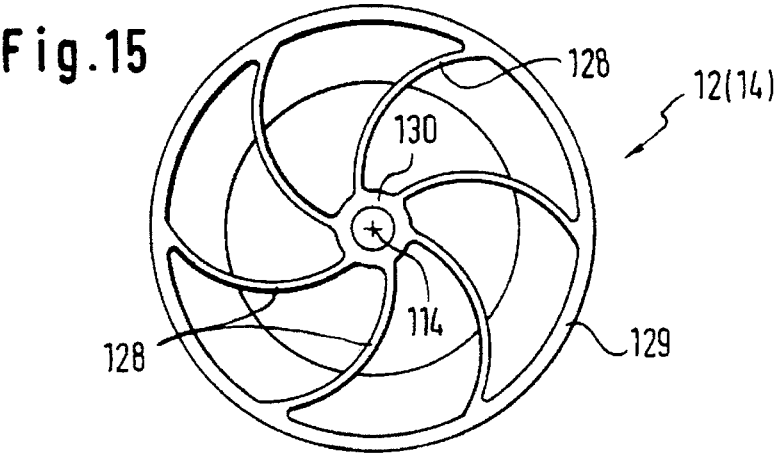
Figure 16:
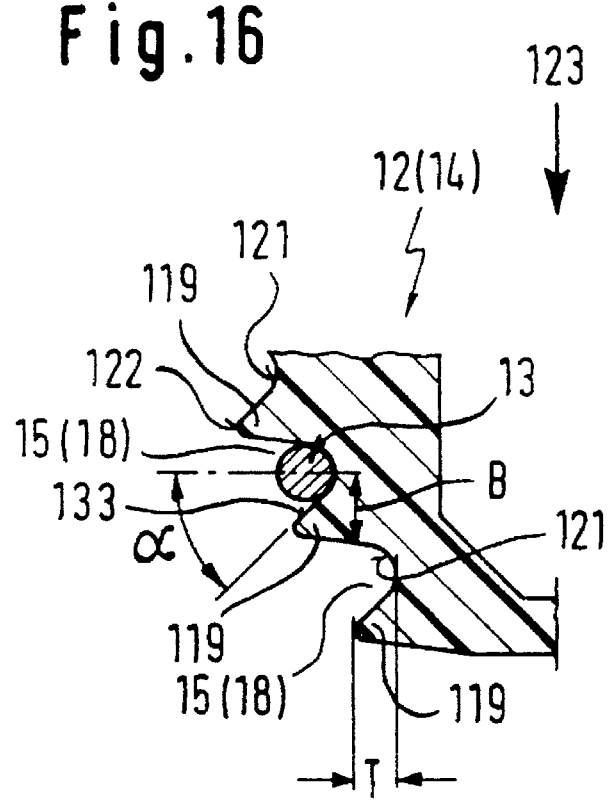
Figure 16A:
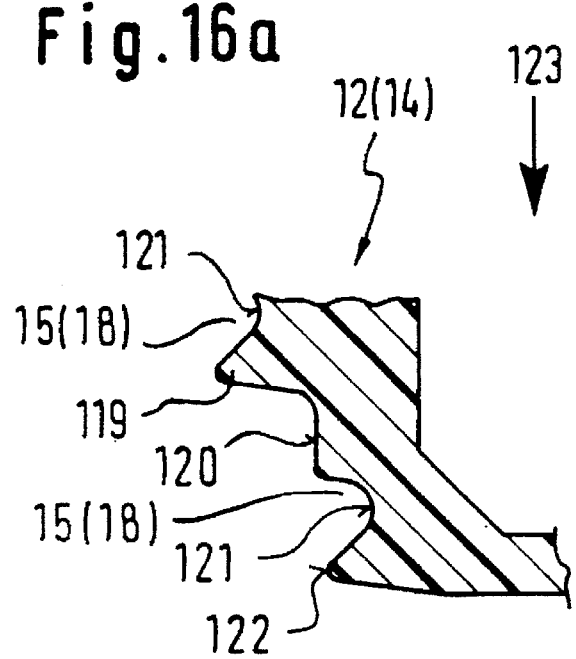
Figure 17:
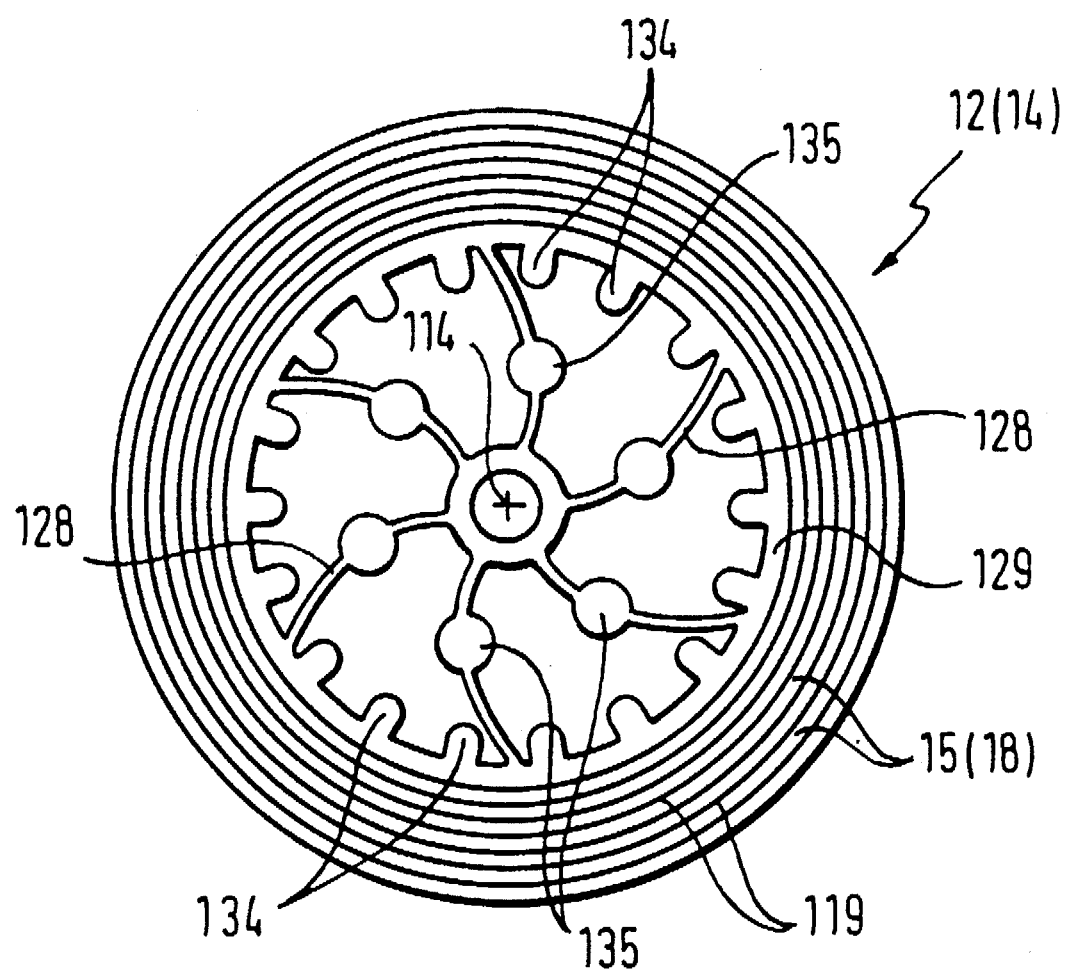

The invention will now be described in the following by way of example and with reference to the drawing in which are shown:

FIG. 1 a partly section view of a spring-driven reeling mechanism for a motor vehicle safety belt in accordance with the invention, FIG. 2 a schematic perspective view of the two thread reels of the embodiment of FIG. 1 which are connected by a thread, FIG. 3 an end view of the two thread reels in the direction of the arrow II of FIGS. 2 and 4 to illustrate the two end stages of the rotation of the thread reel with two different embodiments being reproduced in continuous and chain-dotted lines, FIG. 4 a view similar to FIG. 1 of only the thread reels with the wound-on thread for the schematic illustration of the different axial spacing of the guide grooves in the thread reels, FIG. 5 a schematic sectional view of a further embodiment of a spring-driven reeling mechanism for motor vehicle safety belts in accordance with the invention, FIG. 6 a corresponding schematic sectional view of a further advantageous embodiment, FIG. 7 a draw-out force (K)/draw-out length (L) diagram for a classical reeling mechanism and for a belt reeling mechanism in accordance with FIGS. 1 to 4, FIG. 8 a corresponding diagram for the embodiment of FIG. 5, FIG. 9 a corresponding diagram for the embodiment of FIG. 6, FIG. 10 a schematic sectional view of a further embodiment of a spring-driven belt reeling mechanism in accordance with the invention, FIG. 11 a perspective, schematic reproduction of the belt reeling arrangement of FIG. 1, with a free wheel assembly being additionally provided between the belt reel and the first thread reel, FIG. 12 and 12a a schematic section through the first thread reel of the belt reeling mechanism in accordance with FIGS. 10 and 11, with two different embodiments being shown to the left and the right of the central axis 36 respectively of the first thread reel, FIG. 13 a schematic cross-section of a draw reel formed as a thread reel in accordance with the invention and arranged in an injection mold in accordance with the invention, FIG. 14 a view of the thread reel of FIG. 13 from below, FIG. 15 a view of the same thread reel from above, FIG. 16 the enlarged section IV of the thread reel of FIG. 13, FIG. 16a a modified embodiment of the thread reel of FIG. 13, likewise in an enlarged section IV in accordance with FIG. 13, and FIG. 17 a similar view to that of FIG. 14 of a further advantageous embodiment to a somewhat larger scale.

In accordance with FIG. 1 a belt reeling mechanism in accordance with the invention has a belt reel 11 onto which a safety belt 17 can be wound which is only indicated by a short length. The safety belt 17 is guided in the manner illustrated in broken lines via a customary belt lock 39 around the body of the non-illustrated vehicle occupant to the vehicle chassis 38 and is secured there. The invention is however not only usable with two-point belts, but rather also with three-point belts. The belt reel 11 is rotatably journalled by means of a rotary shaft 19 on a housing 26 which is in turn secured at the bottom to the vehicle chassis 38. At the end of the rotary shaft 19 remote from the belt reel 11, a conically shaped thread reel 12 with a small end face and a large end face 12', 12" respectively is arranged inside the housing 26 and is provided around its periphery with a spirally shaped guide groove 15, the shape of which is schematically illustrated in FIG. 4.

At the end face of the belt reel 11 facing away from the thread reel 12, a belt draw-out blocking device 40 is illustrated in purely schematic form which is secured to the vehicle chassis 38 and prevents the further drawing out of the belt 17 during accelerations caused by accidents and/or when the safety belt 17 is suddenly pulled out.

In accordance with FIGS. 1 and 4, a further thread reel 14 having a small end face and a large end face 14', 14" respectively is provided alongside the thread reel 12 with a parallel axis 20 and laterally aligned therewith. The further thread reel 14 extends conically in the opposite direction to the first thread reel with its smaller diameter being the same as the larger diameter of the first thread reel 12. The large left-hand end face 12" and the small right-hand end face 12' of the small thread reel 12 in FIG. 1 lie substantially in a plane with the left-hand small end face 14' and the right and large end face 14" of the large thread reel 14 respectively. The second thread reel 14 also has a conically spiral guide groove 18 around its periphery and the precise geometrical shape of this groove can be seen in FIG. 4.

The second thread reel 14 is rotatably mounted on a shaft 20 fixed in the housing. The shaft 20 is secured to the housing 26 parallel to and with a lateral spacing from the shaft 19.

The second thread reel 14 has a coaxial hollow cavity 21 in accordance with FIG. 1 at the side of its large end face in which a spiral spring arrangement 16 is provided which is secured at the one end to a spigot 22 fixed on the housing which carries the shaft 20 and at the end to the peripheral wall of the hollow cavity 21 of the thread reel 14. The spiral spring 16 transmits a torque to the thread reel 14 which attempts to wind up a thread laid into its guide groove 18 and secured at 23 in accordance with FIG. 4. The thread 13 extends, in accordance with FIGS. 1 and 4, from the narrowest part of the thread reel 14 to a part of the guide groove 15 of the thread reel 12 aligned therewith, where the thread 13 is secured at 24 to the surface of the thread reel 12.

In the winding position which is evident from FIGS. 1 and 4, the thread 13 is almost fully wound onto the thread reel 14 and is almost fully unwound from the first thread reel 12. In this state, the belt coil 25 on the belt reel 11 has its largest diameter, i.e. a maximum belt length is now wound onto the belt reel 11 and the belt 17 is drawn in is far as possible.

If now the belt 17 is pulled out against the retraction force K in FIG. 1, then the first thread reel 12 rotates with a direction of rotation such that the thread 13 is successively wound onto the first thread reel 12 and unwound from the second thread reel 14, with it increasingly being laid into the guide groove 15 and removed from the guide groove 18.

In accordance with the invention, the pitch angle alpha, i.e. the angle between the straight line extension of the guide grooves 15, 18 at the points of entry of the straight line thread portion 13' and the plane 10 which stands perpendicular to the axis of rotation 19, 20 is constant. Moreover, care has been taken, by corresponding securing of the thread ends at 23, 24, that the thread piece 13' which extends freely and in a straight line between the thread reels 12, 14 enters kink-free into the two guide grooves 15, 18. As a result, with a uniform axial spacing A of the guide grooves 15 on the first thread reel 12, the axial spacing B of the turns of the guide groove 18 on the thread reel 14 having a larger diameter increases continuously in the axial direction towards the larger diameter in the manner evident from FIG. 4.

The fact that the turns of the helical guide groove 15 on the first thread reel 12 are displaced by the same axial amount A signifies that the pitch angle increases from $\alpha$ to $\beta$ from the large diameter to the small diameter.

It would also be conceivable to execute the guide groove 15 on the periphery of the thread reel 12 in such a way that the pitch angle $\alpha$ is constant which would however mean that the axial spacing of neighboring turns of the guide groove 15 reduces as the diameter becomes smaller. Accordingly, the axial spacing B of neighboring turns of the guide groove 18 of the thread reel 14 have to be reduced and there the pitch angle would have to be left constant.

In FIG. 2 the arrangement of the two oppositely conically directed thread reels 12, 14 and of the wind up thread 13 are schematically illustrated in perspective manner without the guide grooves 15, 18 being shown.

FIG. 3 shows in two embodiments the two end positions of the thread 13 in the fully wound up and fully unwound state on the two thread reels 12, 14 respectively.

In accordance with FIG. 3 the thread 13 is illustrated in solid lines being guided crosswise tangentially to the neighboring thread reels 12, 14. In chain-dotted lines the fully wound-up state and the fully unwound state of the thread 13 are shown with non-crossed guidance in the same direction from thread reel 12 to the neighboring thread reel 14. In accordance with the invention, both thread arrangements (crossed or non-crossed) are possible.

The smaller diameter of the thread reel 12 can for example be 15 mm or somewhat larger, while the larger diameter of the smaller thread reel 12 should be 30 to 35 mm. Accordingly, the smaller diameter of the thread reel 14 is 30 to 35 mm and the larger diameter of the thread reel 14 is 100 to 120 mm.

In accordance with FIG. 7 the draw-out force K increases strongly and linearly in dependence on the drawn-out length in accordance with the straight line 36 as a result of the continuously increasing spring force in a classical belt reeling mechanism without the thread reels 12, 14 of the invention, so that the draw-out force is the smallest in the range of application 27, i.e. when being drawn out prior to being put on by the vehicle occupant, and largest in the wearing range 48, i.e. in use when engaged around the vehicle occupant.

Through the use of the counter-conical design of the thread reels 12, 14 of the FIGS. 1 to 4 a constant draw-out force which is quoted in Newtons (N) is achieved in accordance with the straight line 33 independently of the drawn-out length L which is quoted in millimeters.

In the following Figures the same reference numerals will be used to designate components which correspond to those in the above described embodiments.

In accordance with FIG. 5 a thread reel 12 provided with a convex generatrix 29 is arranged on the end of the shaft 19 remote from the reel 11 within the housing 26 and its periphery is again provided with a spiral guide groove 15. The tangent to the generatrix 29 extends at the largest diameter of the thread reel 12 approximately horizontal, so that it drops away in the direction of the smaller diameter towards the axis (shaft 19). The generatrix preferably has an essentially circular shape.

The second thread reel 14 with a larger mean diameter is again provided alongside the thread reel 12 with a parallel axle 20 and laterally aligned and has a concavely curved generatrix 30 complementary to the generatrix 29. The smaller diameter of the thread reel 14 corresponds approximately to the larger diameter of the thread reel 12. The helical guide groove 18 is again provided on the periphery of the second thread reel 14.

In the winding position shown in FIG. 5, the thread 13 is largely completely wound onto the second thread reel 14 and largely completely unwound from the first thread reel 12. In this state the safety belt 17 is drawn in furthest, that is to say retracted into its rest position and the belt coil 25 on the belt reel 11 now has the largest diameter.

If now the belt 17 is pulled out against the retraction force K in FIG. 1, then the first thread reel 12 rotates in a direction such that the thread 13 is successively wound onto the first thread reel 12 with it lying increasingly in the guide groove 15. At the same time the thread 13 is wound off more and more from the second thread reel 14.

In accordance with the invention, the pitch angle between the straight extension of the guide grooves 15, 18 at the points of entry of the straight line thread piece 13' and a plane standing at right angles to the axes of rotation 19, 20 of both guide grooves 15, 18 is the same at the points of entry. Moreover, it is ensured by appropriate mounting of the thread ends that the free thread piece 13' extending between the thread reels 12, 14 opens without kinking into the two guide grooves 15, 18. As a result, with a uniform spacing of the guide grooves 15 on the first thread reel 12, the axial spacing of the turns of the guide groove 18 on the thread reel 14 having the larger diameter continuously increases FIG. 8 shows, apart from the straight force-path line of the classic belt reeling mechanism, also the function 34 in accordance with which the belt reeling mechanism of FIG. 5 operates. Since, in the most retracted state of the safety belt of FIG. 5, the thread 13 is located on the largest diameter of the thread reel 12 and the smallest diameter of the thread reel 14 the belt pull-out force K is greatest in this state.

Since the thread line piece 13' runs with increasing pull-out of the safety belt 17 overproportionally to smaller diameters of the thread reel 12 and to larger diameters of the thread reel 14, the belt pull-out force continuously reduces within the range of application 27 and then adopts a substantially constant value in the wearing region 48.

In the embodiment of FIG. 6, the special chain-dotted generatrices 29', 30' of the thread reels 12, 14 are curves which are complementary to each other which each have a turning point 31 or 32. This leads to a pull-out force/pull-out length function 35 in accordance with FIG. 9. In the range of application 27 the pull-out force K has a relatively large, approximately constant value of approximately 7N in order to then reduce to a lower value of, for example 4 N on the transition from the range of application 27 into the wearing range 48, with this value then further remaining substantially constant within the wearing range 48.

The important action of the embodiments of FIGS. 5 and 6 thus lies in the fact that when the safety belt 17 is drawn back into its rest position, after overcoming a draw-in path of, for example, a few centimeters still within the wearing range 48, a substantially larger retraction force is available from the start of the range of application 27 than in the wearing region 48, where the safety belt 17 lies against the person's body and should not transmit too large tension forces. The draw-in force is thus largest in this critical region, in which the belt should be largely drawn back completely into its rest position after it has been released from the body of the vehicle occupant by opening of the belt lock. Thus, on the one hand, a reliable drawing-in of the belt is ensured after it has been taken off and, on the other hand, the vehicle occupant is subject to the lowest possible irritation when wearing the belt and with the belt lock closed.

In all embodiments the same reference numerals are used to designate corresponding components.

In accordance with FIG. 10, a further embodiment of a belt reeling mechanism in accordance with the invention again has the belt reel 11 onto which the safety belt 17 is wound of which only a short piece is illustrated. The belt reel is rotatably journalled in the housing 26 by means of a shaft 19 of a relatively large diameter in at least one only schematically illustrated bearing 26A. The conically shaped first thread reel 12 is arranged within the housing on the end of the shaft 19 remote from the belt reel 11 and is provided at its periphery with the helical guide groove 15.

In accordance with FIG. 10, the thread reel 14 is again provided alongside the thread reel 12 with a parallel axis 20, is laterally aligned therewith and extends conically in the opposite direction to the first thread reel 12 with its smaller diameter being the same as the larger diameter of the first thread reel 12.

The second thread reel 14 rotatably sits on the shaft 20 which is fixed relative to the housing and is secured to the housing 26 parallel to and at a lateral spacing from the shaft 19. The shaft 20 has a substantially lower diameter than the shaft 19, so that the friction in the spigot bearing 49 formed between the shaft 20 and the second thread reel 14 is as low as possible. The diameter of the shaft 20 or of the bearing 49 should expediently not exceed 5 mm.

In accordance with FIG. 10 an element 41 providing security against rotation is provided on the side of the housing 26 lying axially opposite to the belt reel 11 and is merely mounted there during the installation of the overall arrangement. It consists of a cylindrical head 37 which has a central four-sided spigot 42 which engages through a round bore 44 in the wall of the housing 26 into a complementary coaxial four-sided bore 46 of the first thread reel 12. Furthermore, pins 48 extend from the same side as the four-sided spigot 42 into complementary bores 50 of the wall of the housing 26. As a result of this arrangement, the element providing security against rotation of the first thread reel 12 is rotationally fixedly held on the housing 26. It would also be possible to make both the bore 44 and the spigot 42 four-sided and to do away with the pins 48 and also the bores 50. Furthermore, the pins 48 could extend into corresponding bores in the thread reel 12 and one could do away with the four-sided spigot 42 and also the bore 44.

In accordance with FIG. 10, the hollow cavity 21 in which the spiral spring 16 is arranged is further covered over at the side of the second thread reel 14 having a larger diameter by a plate-like cover 52 which is rotationally fixedly connected by suitable securing means 54 to the thread reel 14.

The cover 52 can be formed as a throughgoing plate, however it preferably consists of a plate provided with numerous apertures, since it is only important that the spiral spring 16 comes exclusively into contact with rotating parts both at the side of the cover 52 and also at the opposite side of the hollow cavity 21 (wall 56).

In accordance with FIGS. 10 and 11, the belt reel 11 is rotationally fixedly connected to the first axle of rotation 19 which is not directly, but rather coaxially in connection with the first thread reel 12 via a free-wheel arrangement 58.

Furthermore, the belt reel 11 is not only connected with a customary draw-out blocking device 40, but rather also with an only schematically illustrated belt tensioner 60 which, in the event of an accident-dependent acceleration, brings about an abrupt rotation of the belt reel 11 in the belt reeling direction, so that the safety belt 17 which initially lies loosely across the body of the occupant is so strongly tensioned that the occupant cannot fall into a belt which is too loose and thereby suffer damage. Following this, the draw-out blocking device 40 then prevents drawing out of the safety belt.

As can be seen in particular from FIG. 11, the free-wheel arrangement 58 is so formed that a reeling-up torque is exerted on the belt reel 11 at any time from the belt reel 12 during unwinding of the thread 13, but such that on driving of the belt reel 11 by the belt tensioning device 60 in the direction of the arrow in FIG. 11, no torque or only a minimum torque is exerted on the first thread reel 12. In this way, it is avoided that the draw element 13 becomes loose through too great an acceleration of the first thread reel 12 in the thread unwinding direction and springs out of the guide grooves 15, 18.

The free-wheel arrangement can also be realized by a ratchet arrangement.

In accordance with FIG. 12 the thread 13 which is wound onto the first thread reel 12 during the installation can be covered over by a wax layer 62 which coats the entire wound surface 64 and thereby prevents the turns of the thread 13 dropping out of the guide grooves 15. Alternatively, a cover hood 66 consisting for example of foam can however also be used in accordance with the illustration of FIG. 12a to the right of the central axis 68 to secure the thread 13 in the guide groove 15. The cover hood is mounted from the side of the conical thread reel 12 having the smallest diameter, contacts the wound surface 64 everywhere and thereby holds the thread in the guide groove 15.

The installation of a belt reeling mechanism in accordance with the invention now proceeds as follows:

First of all, the thread 13 is wound by means of a suitable apparatus onto the first thread reel 12 and is then fixed in the wound-on position by means of a wax layer 62 (FIG. 12 to the left of the central axis 68) or by means of an elastic cover hood 66 (FIG. 12a to the right of the central axis 68).

The thread reels 12, 14 are now arranged in the housing 26 which is to be opened in a suitable manner. The thread end 70 projecting from the axial end of the first draw reel 12 having the smaller diameter is now secured to the second thread reel 14 located alongside it in a suitable manner, and indeed with the fully pretensioned spiral spring 16. A suitable installation device can also be used for this.

In order now to prevent immediate unwinding of the thread 13 from the first thread reel 12 after the mounting of the thread end 44 on the second thread reel 14, the first thread reel 12 is rotationally fixedly held at the housing 26 by pushing the four-sided spigot 42 of the element 41 providing security against rotation into the four-sided bore 46 and the pins 48 into the bores 50 of the housing 26. In this way, the draw element 13 is so tensioned that it is reliably held in the guide grooves 15, 18.

In this stage of the installation, the rotational axis 19 of the belt reel 11 with the free-wheel arrangement 58 has not yet been inserted into the first thread reel 12 so that the first thread reel 12 is not only rotationally fixed but also centered exclusively by the element 41 providing security against rotation, i.e. centered axially with the through-bore in the housing 26 for the rotary axle 19.

The operable thread arrangement mounted in the housing 26 can now be connected to the belt reel 11 by pushing the rotary shaft 19 with the free-wheel arrangement 34 into a corresponding non-round bore of the first thread reel 12.

After producing this connection the element 41 providing security against rotation is drawn off axially from the housing 26, whereupon the spiral spring 16 can rotate the first thread reel 12 via second thread reel 14 and the thread 13 in the belt winding direction and the belt reel 11 is correspondingly moved with it, with the belt coil 25 being formed.

With the first unwinding of the thread 13 from the first thread reel 12 the wax layer 62 (FIG. 12) now simply splits off with the guide groove 15 finally being fully exposed. By drawing out of the safety belt 17 contrary to the arrow K in FIG. 1 the first thread reel 12 is then turned in the opposite direction with the thread 13 being increasingly wound off from the second thread reel 14 and onto the first thread reel 12. The free-wheel arrangement 58 hereby enables a problemfree torque transmission.

In the case of an acceleration caused by an accident, the belt tensioner 60 is actuated and the belt reel 11 is abruptly set rotating in the belt winding direction. However, the free-wheel arrangement 58 prevents a transmission of the corresponding torque from the axle of rotation 19 to the first thread reel 12 and thus loosening of the thread 13 is avoided.

In accordance with the FIGS. 13 to 15 a thread reel 12 or 14 respectively in accordance with the invention comprises a central hollow carrying spigot 130 from which slightly curved thin carrying walls 128 extend substantially in the radial direction and carry a truncated cone-like thin wall of the rotational body 129. The thread reel 12 or 14 respectively is intended for rotation about an axis 114. The carrying walls 128 are parts of cylinders, the generatrices of which extend axially.

The carrying spigot 130 extends clearly beyond the tapered end of the rotational body 129, which must not however necessarily be the case and there forms a receiving element for a rotary bearing or for a non-illustrated winding reel which accommodates the safety belt. From the lower end region of the carrying spigot 130 stiffening elements 127 extend obliquely outwardly relative to the rotational body 129 and are in a position of being able to accommodate axial forces. The thread reel 12 or 14 respectively is arranged in accordance with FIG. 13 within an injection mold 113 illustrated in broken lines which consists of two mold parts 113a, 113b which abut against one another along a planar surface 115 which coincides with the plane extending perpendicular to the axis 114 in the region of the largest diameter of the thread reel 12 or 14 respectively. Heating channels 131 and cooling channels 132 are provided in the mold part 113a and are only purely schematically illustrated.

In the region of the lower mold part 113a lying axially opposite to the tapered end of the thread reel 12 or 14 respectively there is located a central opening 125, the diameter of which is so large that a demolding tool 126 can be introduced and can be brought into engagement with a demolding surface 124 at the lower end of the carrying spigot 130.

As can be seen from the FIGS. 13, 14 and 16 the combined helical thread-like guide grooves 15 and 18 respectively are located in the outer peripheral surface of the rotational body 129. In accordance with FIG. 16 the thread 13 is arranged in the guide groove 18 during the later use of the thread reel 12 or 14 respectively. The thread 13 is illustrated only by way of example in FIG. 16 in the central region of the two guide grooves 15 and 18 respectively in order to make clear the dimensional relationships between the cross-section of the thread 13 and the guide grooves 15 and 18 respectively.

Between the adjacent guide grooves 15 and 18 respectively in the axial direction there is in each case a radially projecting rib 119 which, as can be seen from FIGS. 16 and 16a, tapers radially outwardly and is rounded at its outer periphery to form an apex 122. The base 121 of each guide groove 15 or 18 respectively is rounded in the manner evident from FIGS. 16 and 16a in order to achieve a form-locked accommodation for the thread 13 as far as possible.

When seen in the tapering direction 123 each guide groove 15 or 18 respectively is followed for example by an outwardly rising flank 133 at an angle $\alpha$ of 45 degrees. From the end of the rounding of the apex 122 of the rib 119 an approximately radial plane then extends up to the following guide groove 15 or 18 respectively.

Seen in FIG. 13 an inner surface 117 of the mold part 113a of complementary shape to the outer surface 116 of the thread reel (12 or 14) surrounds the thread reel 12 or 14 respectively. The mold part 113b adjoins the mold part 113a from the top and has a region 113c which is likewise illustrated in broken lines which extends into the thread reel 12 or 14 and which is of complementary shape to the inner space of the thread reel 12 or 14 respectively.

As can be seen from the FIGS. 13 to 16 the flanks 133 of the ribs 119 stand in the way of demolding by axial extraction of the mold part 113a in the direction of the arrow p in FIG. 13. Through suitable resilient design of the material of the thread reel 12 or 14, through a flank angle 133 which is not too small, through a base width B as defined in FIG. 16 which is not too large and through a groove depth T which is not too large, as is likewise defined in FIG. 16, the ribs 119 can deflect during axial demolding in just the same way as the wall of rotational body 129 and also the carrying walls 128 to such an extent that clean demolding is possible despite the one-piece nature of the mold part 113a.

Insofar as the guide grooves 12 or 14 of FIG. 16a have a greater axial spacing from one another, the ribs 119 should initially drop off strongly radially inwardly in the tapering direction 123 in order to merge there into a peripheral surface 120 which likewise tapers at least somewhat in the tapering direction 123. In this way, a problemfree outward springing of the preceding rib 119 during demolding is aided.

The cone angle $\beta$ of the thread reel 12 or 14 drawn in FIG. 13 is also important for the ease of demolding and is reproduced in FIG. 13 with reference to a line 114' which extends parallel to the axis 114. The larger the cone angle beta is, the easier it is to effect the demolding. Important is furthermore the at least substantially smooth and also tapered form of the inner surface of the rotational body 129 in the direction 123. On average the inner surface and the outer surface 116 should extend parallel to one another so that the wall thickness—apart from the changes brought about by the guide grooves 15 and 18 respectively, by the ribs 119 and optionally peripheral surfaces 120 remains constant on average in the axial direction.

The manner of operation of the described arrangement is as follows:

First of all, the injection mold 113 is brought into the closed shape evident from FIG. 13 and heated up. Then the plastic material is injected into the mold through non-shown channels and the molded body, corresponding to the thread reel 12 or 14 respectively, is then formed. The injection temperature of the plastic generally amounts to 210 to 220 degrees C.

Polyoxymethylene is preferably used as the plastic material.

After the thread reel 12 or 14 has been finish molded one cools it to 80° to 120° C. and then demolds the finished thread reel 12 or 14 respectively in that in the first place the mold parts 113b, c in FIG. 13 which form one piece are removed upwardly. Then a demolding tool 126 is inserted through the central opening 125 of the mold part 113a (from below in FIG. 13) while a retaining force is exerted on the mold part 113a in the direction of the arrow p in FIG. 13. The forces which are exerted on the demolding tool 126 and on the mold part 113a in opposite directions must now be sufficiently large that the complementary regions of the mold part 113a lying in the guide groove 15 or 18 respectively, the ribs 119 and other parts of the thread reel 12 or 14 respectively are pressed without destruction axially and/or radially inwardly to such an extent that an axial displacement of the mold part 113a relative to the thread reel 12 or 14 or relative to the demolding tool 126 comes about. It is important that a radially inwardly directed projection at the inner surface 117 of the mold part 113a only comes into contact during demolding with the rib 119 which directly follows in the tapering direction 123 but not however with the next but one rib 119 which should already have been displaced radially inwardly to such an extent that it also comes out of engagement with the projection on the mold part 113a associated with it.

In this manner destruction-free demolding is ensured despite the presence of undercuts on the outer surface 116. The inner surfaces of the thread reel 12 or 14 respectively should be at least substantially undercutfree. For the individual parameters of the thread reel 12 or 14 of the invention the following ranges are preferred:

cone angle β: 30° to 45°, in particular 25° to 40°;
flank angle α: 30° to 60°, in particular about 45°;
base width B: ca. 0.5 mm;
groove depth T: ca. 0.5 mm;
bending modulus of elasticity of the plastic material used at 23° C.: 2.5 to 3.0 MPa;
mean thickness of the peripheral wall of the rotational body 29: 0.5 to 1.5, preferably 1.0 mm.
Number of the carrier walls 28 distributed preferably uniformly around the periphery: 4 to 8, in particular 6;
Radius of curvature of the carrying walls 28: larger than 6 mm;
thickness of the carrying walls 28: ca. 0.5 mm;
diameter of the draw element 13: 0.3–0.6 mm depending on the nature of draw element (thread or cable).

Finally it should be pointed out that for demolding purposes only the thread reel 12 or 14 respectively and the individual parts of the same should be resiliently designed, whereas the mold tool used is absolutely rigid. The design of the thread reel 12 or 14 which is on the whole hollow is of particular importance for the yielding during demolding.

The radial carrying means, namely the carrying walls 128 for the rotational body 129 are radially elastic in accordance with the invention. The axial stiffening elements 127 which are of particular importance for the transmission of axial demolding forces should in contrast be as stiff as possible.

For easy demolding, the asymmetrical design of the guide grooves 15 or 18 in accordance with the FIGS. 16 and 17, is also of importance. Whereas the flanks which are present contrary to the direction of tapering 123 lie essentially in radial planes, the demolding flanks 133 are arranged at comparatively large angles α.

The inner wall of the rotational body 129 is smooth and is preferably conically tapering everywhere in the axial direction 123. The carrying walls 128 and the carrying spigot 130 are correspondingly smooth and formed without undercuts so that no problems exist in these regions during demolding. The surfaces of the carrying spigot 130, which is preferably formed as a hollow spigot and the carrying walls 128 are slightly tapered contrary to the direction of tapering 123 in order to facilitate the demolding.

In the embodiment of FIG. 17 rib-like thickened portions 134 arranged at small distances and distributed uniformly over the periphery are injection-molded onto the inner surface of the rotational body and extend parallel to the generatrix of the rotational body 129, i.e. in the direction of tapering 123, in just the same way as the peripheral surface of the rotational body 129, and increasingly approach the axis 114 depending on the cone or taper angle.

In the embodiment of FIG. 17 18 rib-like thickened portions 134 are uniformly distributed over the periphery between which there are located non-thickened regions of a corresponding peripheral extent.

Projecting rib-like thickened portions 135 are likewise provided at both sides within the carrying walls 128, however, extend in the radial direction over only a sufficiently small distance that they hardly affect the elastic bendability of the carrying walls 128.

The thickened portions 134, 135 have the purpose that suitable demolding tools suitable can act analogously to the demolding tool 126 of FIG. 13 from the respective end face during demolding.

The additional demolding tools each engage from below at the end faces in accordance with FIG. 13, i.e. against the corresponding end faces of the rib-like thickened portions 134 and 135. In the lower mold part 113a axial openings are provided for the additional demolding tools which correspond in their function and design to the opening 125 provided for the demolding tool 126.

With the provision of the thickened portions 134, 135 the stiffening elements 127 provided for the purpose of stiffening can be omitted or can be made weaker.

The basic concept of this embodiment thus lies in the fact that the individual components can be axially stiffened for the demolding process, which is associated with considerable forces, without substantially reducing the radially elastic yieldability of the thread reel.

We claim:

1. Spring-driven reeling mechanism for safety belts (17) in motor vehicles comprising a belt reel (11) which can be blocked against rotation in the pull-out direction by a pull-out lock (40) triggerable by accelerations caused by an accident and/or with an attempted rapid pull-out of the safety belt (17) and which is rotationally fixedly connected to a first draw reel (12) which tapers in an axial direction and has a spirally-shaped groove (15) on its periphery; wherein the first draw reel (12) is rotationally fixedly connected, via a flexible draw member (13) wound contrary to the direction of winding of the safety belt (17) on the belt reel (11) into the guide groove (15) and secured at one end to the first draw reel (12), to a second draw reel (14) which tapers in the opposite axial direction and is arranged parallel to and aligned sideways relative to the first draw reel (12), with the second draw reel (14) having a spiral guide groove (18) and with the other end of the draw member (13) being secured to the second draw reel (14) and being wound into the guide groove (18), wherein said second draw reel (14) is biased by a spring arrangement (16) in a direction such as to wind the draw member (13) onto the second draw reel (14) and the safety belt (17) onto the belt reel (11), and wherein the two guide grooves (15, 18) are so shaped and arranged on the draw reels (12, 14) that the tensioned draw member (13) which connects the two draw reels (12, 14) passes essentially kink-free into the two draw member windings on the draw reels (12, 14), characterized in that the spring arrangement (16) is accommodated in a hollow cavity (21) of the second draw reel (14) which is surrounded at least partly by the guide groove (15), and the hollow cavity (21) is covered by a cover (52) secured axially to the second draw reel (14) in such a way that the spring arrangement (16) is only surrounded by parts which rotate with the second draw member (14).

2. Reeling mechanism in accordance with claim 1, characterized in that the hollow cavity (21) is open towards one end face of the second draw reel (14) and the spring arrangement (16) is inserted from there.

3. Reeling mechanism in accordance with claim 1, characterized in that the hollow cavity (21) is provided at the side of the second draw reel (14) to which the diameter increases.

4. Reeling mechanism in accordance with claim 1, characterized in that the hollow cavity (21) is arranged coaxially to the second draw reel (14).

5. Reeling mechanism in accordance with claim 1, characterized in that the second draw reel (14) sits rotatably on a shaft (20) fixed relative to the housing and the spring arrangement accommodated in the hollow chamber (21') which is formed as a spiral spring (16) is fixed radially outwardly at the outer periphery (21) of the hollow cavity (21) of the second draw reel (14) and is fixed radially inwardly to the housing.

6. Reeling mechanism in accordance with claim 5, characterized in that the spiral spring (16) is fixed radially inwardly on a spigot (22) fixed relative to the housing which carries the shaft (20) and has a larger diameter than the shaft (20).

7. Reeling mechanism in accordance with claim 1, characterized in that the two thread reels (12, 14) extend conically in opposite directions.

8. Reeling mechanism in accordance with claim 1, characterized in that the generatrices of the two draw reels (12, 14) extend oppositely curved to one another.

9. Reeling mechanism in accordance with claim 8, characterized in that the generatrices of the two reels (12, 14) are oppositely curved in such a way that a predetermined resetting force is provided at the start of the belt draw-out movement in the range of application (27) which reduces in step-like manner to a value lower than the predetermined resetting force from a predetermined draw-out length onwards at the start of the wearing range (48) Of the belt about a vehicle occupant.

10. Reeling mechanism in accordance with claim 1, characterized in that the mean diameter of the first draw reel (12) which carries the belt reel (11) is substantially smaller than the mean diameter of the draw reel (14) which is connected to the spring arrangement (16).

11. Reeling mechanism in accordance with claim 1, characterized in that the larger diameter of the first draw reel (12) is substantially the same as the smaller diameter of the second draw reel (14).

12. Reeling mechanism in accordance with claim 1, characterized in that the spiral axial groove of the second draw reel (14) has turns thereof with adjacent turns being equally spaced at a second distance axially from each other along the second draw reel, and the spiral axial groove of the first draw reel has turns thereof with adjacent turns being equally spaced at a first distance axially from each other along the first draw reel with the second distance being greater than the first distance.

13. Reeling mechanism in accordance with claim 1, characterized in that the second draw reel (154) is arranged at the side of the first draw reel (12) remote from the draw-out direction of the safety belt (17).

14. Spring-driven reeling mechanism for safety belts (17) in motor vehicles comprising a belt reel (11) which can be blocked against rotation in the pull-out direction by a pull-out lock (40) triggerable by accelerations caused by an accident and/or with an attempted rapid pull-out of the safety belt (17) and which is rotationally fixedly connected to a first draw reel (12) which tapers in an axial direction and has a spirally-shaped guide groove (15) on its periphery; wherein the first draw reel (12) is rotationally fixedly connected, via a flexible draw member (13) wound contrary to the direction of winding of the safety belt (17) on the belt reel (11) into the guide groove (15) and secured at one end to the first draw reel (12), to a second draw reel (14) which tapers in the opposite axial direction and is arranged parallel to and aligned sideways relative to the first draw reel (12), with the second draw reel (14) having a spiral guide groove (18) and with the other end of the draw member (13) being secured to the second draw reel (14) and being wound into the guide groove (18), wherein said second draw reel (14) is biased by a spring arrangement (16) in a direction such as to wind the draw member (13) onto the second draw reel (14) and the safety belt (17) onto the belt reel (11), and wherein the two guide grooves (15, 18) are so shaped and arranged on the draw reels (12, 14) that the tensioned draw member (13) which connects the two draw reels (12, 14) passes essentially kink-free into the two draw member windings on the draw reels (12, 14) wherein the belt reel (11) can be acted on in the belt draw-in direction by another drive source in the event of an acceleration caused by an accident or with a sudden drawout of the safety belt characterized in that a free wheel arrangement (58) is inserted between the belt reel (11) and the first draw reel (12) which, on driving of the first draw reel (12) in the belt reeling-up direction, transmits torque to the belt reel (11) and, on driving the belt reel (11) in the belt reel-up direction by the other drive source transmits no torque or only minimal torque to the first draw reel (12).

15. Spring-driven reeling mechanism for safety belts (17) in motor vehicles comprising a belt reel (11) which can be blocked against rotation in the pull-out direction by a pull-out lock (40) triggerable by accelerations caused by an accident and/or with an attempted rapid pull-out of the safety belt (17) and which is rotationally fixedly connected to a first draw reel (12) which is mounted on an axle (19) and which tapers in an axial direction and has a spirally-shaped guide groove (15) on its periphery; wherein the first draw reel (12) is rotationally fixedly connected, via a flexible draw member (13) wound contrary to the direction of winding of the safety belt (17) on the belt reel (11) into the guide groove (15) and secured at one end to the second draw reel (12), to a second draw reel (14) which is mounted on an axle (20) and which tapers in the opposite axial direction and is arranged parallel to and aligned sideways relative to the first draw reel (12), with the second draw reel (14) having a spiral guide groove (18) and with the other end of the draw member (13) being secured to the second draw reel (14) and being wound into the guide groove (18), wherein said second draw reel (14) is biased by a spring arrangement (16) in a direction such as to wind the draw member (13) onto the second draw reel (14) and the safety belt (17) onto the belt reel (11), and wherein the two guide grooves (15, 18) are so shaped and arranged on the draw reels (12, 14) that the tensioned draw member (13) which connects the two draw reels (12, 14) passes essentially kink-free into the two draw member windings on the draw reels (12, 14) characterized in that the safety belt (17) is drawn off from the same side of the rotational axis (19) of the belt reel (11) as the draw member (13) from the first draw reel (12) but in the opposite direction to the draw reel (12); and in that the diameter of the rotational axle (20) of the second draw reel (14) arranged on the side of the first draw reel (12) remote from the belt pull-out direction is substantially smaller than the diameter of the rotational axle (19) of the belt reel (11).

* * * * *

UNITED STATES PATENT AND TRADEMARK OFFICE
CERTIFICATE OF CORRECTION

PATENT NO. : 5,624,084
DATED : April 29, 1997
INVENTOR(S) : Kopetzky et al.

It is certified that error appears in the above-indentified patent and that said Letters Patent is hereby corrected as shown below:

Claim 5, column 17, line 14, change "(21')  to --(21)--.
Claim 5, column 17, line 16, change "(21)  to --(21')--.
Claim 9, column 17, line 35, change "OF" to --of--.
Claim 14, column 18, line 22, change "drawout" to --draw-out--.

Signed and Sealed this

Second Day of September, 1997

Attest:

BRUCE LEHMAN

*Attesting Officer*    *Commissioner of Patents and Trademarks*